(12) United States Patent
Thibault

(10) Patent No.: US 6,999,182 B2
(45) Date of Patent: Feb. 14, 2006

(54) METHOD AND SYSTEM FOR CHARACTERIZING ASPHERIC SURFACES OF OPTICAL ELEMENTS

(75) Inventor: Simon Thibault, Sainte-Foy (CA)

(73) Assignee: Institut National d'Optique, Sainte-Foy (CA)

( * ) Notice: Subject to any disclaimer, the term of this patent is extended or adjusted under 35 U.S.C. 154(b) by 209 days.

(21) Appl. No.: 10/403,171

(22) Filed: Mar. 31, 2003

(65) Prior Publication Data

US 2004/0190000 A1      Sep. 30, 2004

(30) Foreign Application Priority Data

Mar. 28, 2003   (CA)  ................................. 2424023

(51) Int. Cl.
    *G01B 9/02*       (2006.01)
(52) U.S. Cl. ........................................ 356/513; 356/512
(58) Field of Classification Search ................ 356/512, 356/489, 495, 513
    See application file for complete search history.

(56) References Cited

U.S. PATENT DOCUMENTS

| | | | |
|---|---|---|---|
| 4,725,144 A * | 2/1988 | Nelson et al. | ............... 356/513 |
| 5,155,553 A | 10/1992 | Chen | |
| 5,155,554 A | 10/1992 | Schnable et al. | |
| 5,410,408 A | 4/1995 | Evans et al. | |
| 5,986,760 A | 11/1999 | Nakayama et al. | |
| 6,449,049 B1 | 9/2002 | Lam et al. | |
| 6,452,145 B1 | 9/2002 | Graves et al. | |
| 6,842,255 B1 * | 1/2005 | Ohsaki et al. | ............... 356/513 |

OTHER PUBLICATIONS

Curatu, Eugene, and Wang, Min, "Tolerancing and Testing of CGH Aspheric Nulls," proceedings of SPIE Conference on Optical Manufacturing and Testing III, Denver, Colorado, Jul. 1999.

Loomis, John S., "Computer-Generated Holography and Optical Testing," Optical Engineering, vol. 19 No. 5, Sep./Oct. 1980.

* cited by examiner

*Primary Examiner*—Gregory J. Toatley
*Assistant Examiner*—Patrick Connolly
(74) *Attorney, Agent, or Firm*—Wallenstein Wagner & Rockey, Ltd.

(57) ABSTRACT

A system for characterizing an aspheric surface with respect to an expected shape thereof, comprising a light source to emit light of desirable properties. A ferrofluid deformable mirror apparatus has a reflective surface being controllably deformable. The reflective surface is shaped as a function of the expected shape so as to reflect light in a known path toward a detector. Optical elements project light from the light source onto the aspheric surface such that light is reflected along an expected path if the aspheric surface has the expected shape. Light is reflected from the aspheric surface along an actual path. The optical elements project light on the reflective surface of the ferrofluid deformable apparatus such that light is reflected along the known path. A detector receives light reflected along at least one of the actual path and the known path to obtain an interference pattern as a function of the expected path. Means are provided for interpreting the interference pattern so as to characterize the aspheric surface with respect to the expected shape.

11 Claims, 2 Drawing Sheets

METHOD AND SYSTEM FOR CHARACTERIZING ASPHERIC SURFACES OF OPTICAL ELEMENTS

This Application is the U.S. filing claiming priority from Canadian Application No. 2,424,023 filed Mar. 28, 2003, now pending.

BACKGROUND OF THE INVENTION

1. Field of the Invention

The present invention generally relates to aspheric surfaces and, more particularly, to a method and a system for characterizing the aspheric surfaces of optical elements.

2. Background Art

Null testing is a well known technique used to measure with precision flaws or defects of optical elements. In null testing, two wavefronts divided from one propagating light wave of constant phase are directed along separate optical paths, i.e., the test path and the reference path. The wavefront of the test path, i.e., the test wavefront, is directed toward an-optical surface to be characterized. The test wavefront will then be returned from the test path to an interferometer, wherein it will be reunited with the wavefront of the reference path, i.e., the reference wavefront, in an interference analysis.

The test path and the reference path are arranged such that, if the aspheric surface is without detectable irregularities, the test and reference wavefronts will be the same upon reaching the interferometer, i.e., the differences between the test and the reference wavefronts should be "null." In practice, an aspheric surface may have some detectable irregularities that will cause deviation of the test wavefront in the test path. Any deviation in the wavefront will produce fringe distortions in an interference pattern with the wavefront of the reference path. As known in the art, the fringe distortions in the interferometer are readily interpretable, e.g., using a wavefront analyzer with appropriate software, so as to identify with great precision the irregularities in the aspheric surface of the optical element, and thus characterize the latter.

There are a few null testing systems that differ in test path configurations. Referring to FIG. 1 of the prior art, a portion of a test path of a known optical null testing system is generally shown at 10. The test path portion 10 has a reflective mirror 11 with a concentric aperture 12 and a reflective surface 17. The surface to be tested is generally shown at 13 and consists of an aspheric surface of a concave mirror. A test wavefront 14 converges out of the aperture 12 onto the test surface 13. The direction of the wavefront 14 going to the reflective surface 17 is shown by arrowheads 15. The aperture 12 is positioned such that the wavefront 14 is collimated upon being reflected by the test surface 13. The reflective surface 17 of the reflective mirror 11 is shaped as a function of the test surface 13. More precisely, every point on the reflective surface 17 is positioned tangentially with respect to the incoming wavefront 14, as anticipated from the theoretical shape of the test surface 13. If the test surface 13 does not have detectable flaws, i.e., the actual shape of the test surface 13 is the same as the theoretical shape, the wavefront 14 should return taking the same path, although in reversal, as shown by arrowheads 16. However, if there are detectable surface irregularities on the test surface 13, portions of the wavefront 14 will be deflected from the expected path and will thus not return in the reverted direction. Therefore, the wavefront 14 exiting through the aperture 12 will exclude the portions of the wavefront 14 that were deflected by the surface irregularities of the test surface 13. The wavefront 14 exiting from the aperture 12 with the reference wavefront (not shown) will be united in an interferometer. Interference fringes will appear for the wavefront portions that have not returned from the test path portion 10. The interpretation of the interference fringes will enable the precise identification of the irregularities on the test surface 13.

One disadvantage of null testing in its various systems is that a reflective mirror being precisely shaped (i.e., shaped to the level of precision that is desired) as a function of the tested aspheric surface to be tested must be provided. This requires that a reflective mirror or equivalent surface (e.g., computer-generated hologram) be provided for each different shape of aspheric surface. Optical elements of specific dimensions are costly to manufacture, and thus the characterization of aspheric surfaces is a costly procedure. Accordingly, users of aspheric surfaces often rely on the manufacturers of the aspheric surfaces for the characterization thereof.

SUMMARY OF INVENTION

Therefore, it is an aim of the present invention to provide a novel method for characterizing aspheric surfaces of optical elements.

It is a further aim of the present invention that the method substantially overcome the disadvantage of the prior art.

It is a still further aim of the present invention to provide a novel null testing system.

It is a still further aim of the present invention to provide a null testing system having a reflective surface that is readily adaptable to the aspheric surface to be tested.

Therefore, in accordance with the present invention, there is provided a method for characterizing an aspheric surface with respect to an expected shape thereof, comprising the steps of: i) providing a deformable mirror apparatus having a reflective surface being controllably deformable; ii) shaping the reflective surface as a function of the expected shape of the aspheric surface so as to reflect light along a known path; iii) providing optical elements adapted to project light on the aspheric surface such that light would be reflected along an expected path if the aspheric surface had said expected shape; iv) projecting light with the optical elements on the aspheric surface such that light is reflected along an actual path; v) projecting light on the reflective surface of the deformable mirror apparatus such that light is reflected along said known path; vi) receiving light reflected in at least one of said actual path and said known path with the optical elements to obtain an interference pattern as a function of the expected path; and vii) interpreting the interference pattern to characterize the aspheric surface with respect to the expected shape.

Further in accordance with the present invention, there is provided a system for characterizing an aspheric surface with respect to an expected shape thereof, comprising: a light source adapted to emit light of desirable properties; a deformable mirror apparatus having a reflective surface being controllably deformable, the reflective surface being shaped as a function of said expected shape so as to reflect light in a known path toward a detector; optical elements adapted to project light from the light source onto the aspheric surface such that light would be reflected along an expected path if the aspheric surface had said expected shape, light being reflected from the aspheric surface along an actual path, the optical elements being further adapted to project light on the reflective surface of the deformable apparatus such that light is reflected along said known path; a detector adapted to receive light reflected along at least one of the actual path and the known path to obtain an interference pattern as a function of the expected path; and means for interpreting the interference pattern so as to characterize the aspheric surface with respect to said expected shape.

BRIEF DESCRIPTION OF THE DRAWINGS

Having thus generally described the nature of the invention, reference will now be made to the accompanying drawings, showing by way of illustration a preferred embodiment thereof and in which.

DESCRIPTION OF THE PREFERRED EMBODIMENTS

Figure 1:
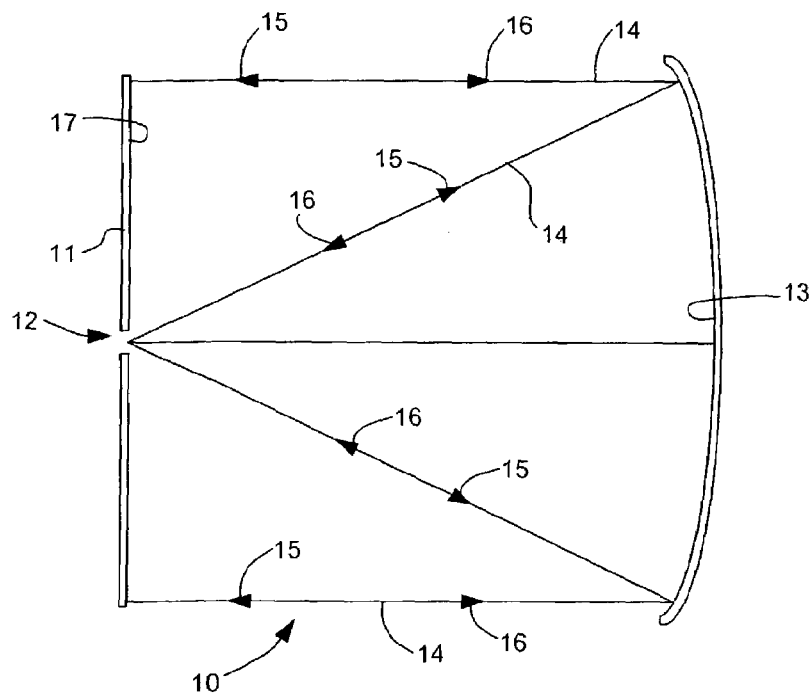
FIG. 1 is a test path portion of an optical null testing system in accordance with the prior art.
Figure 2:
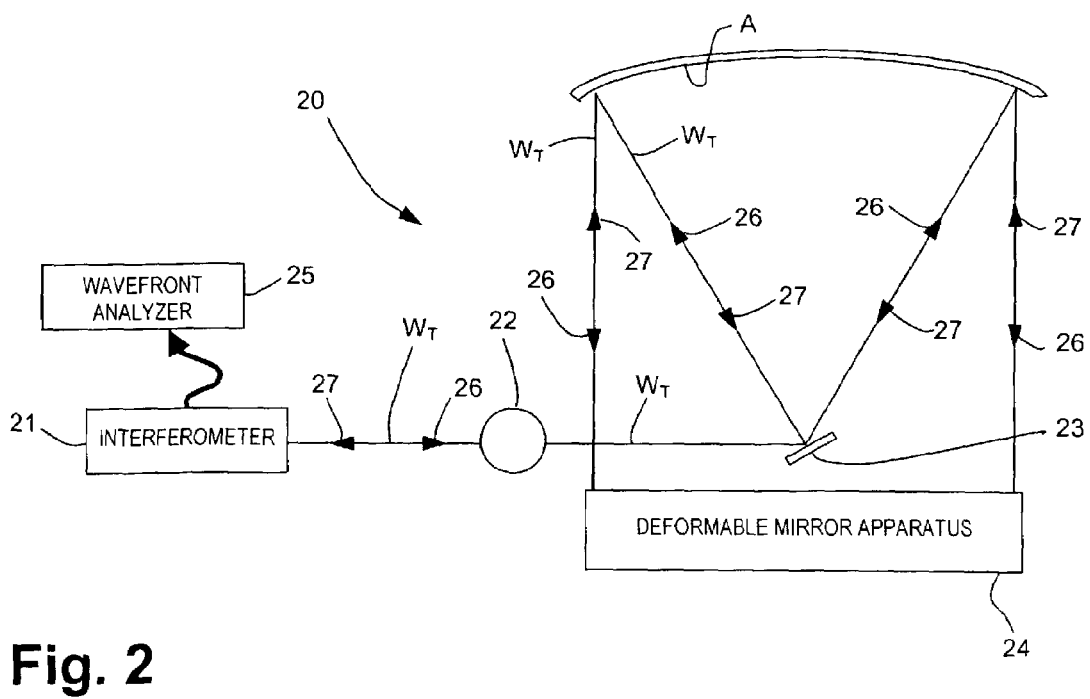
FIG. 2 is a schematic view of an optical null testing system in accordance with a first embodiment of the present invention.

Referring to the drawings, and more particularly to FIG. 2, an optical null testing system in accordance with a first embodiment of the present invention is generally shown at 20. The optical null testing system 20 comprises an interferometer 21, a light transmitter/receiver 22, a mirror 23, and a deformable mirror apparatus 24, which are arranged with respect to an aspheric surface A to characterize the aspheric surface A. A wavefront analyzer is wired to the interferometer 21 to interpret the interference patterns. It is pointed out that an interference pattern will shown interference fringes as a result of surface irregularities to the surface being tested. On the other hand, if the surface irregularities are too small to be detected, the interference pattern will show no interference fringe.

The interferometer 21 includes a light source that will emit a monochromatic light wave of constant phase that will be divided into the reference wavefront (not shown) and the test wavefront $W_T$. The light wave emitted by the light source is preferably collimated. In addition to being at the emitting end of the test path, the interferometer 21 will also be at the receiving end of the path, to receive the returning test wavefront $W_T$. The returning test wavefront $W_T$ will be reunited with the reference wavefront to get an interference pattern. It is pointed out that the reference wavefront in the first embodiment is confined to the interferometer 21. Any well known commercial interferometer suitable for null testing may be used.

The light transmitter/receiver 22 is typically a light transmission sphere or other similar optical element. In a first action, the light transmitter/receiver 22 transmits the test wavefront $W_T$ from the interferometer 21 to the mirror 23. The test wavefront $W_T$ from the interferometer 21 is preferably collimated at the light transmitter/receiver 22, to be transmitted thereby as a converging wavefront. In a second action, the light transmitter/receiver 22 receives the returning diverging test wavefront $W_T$ from the test portion of the testing system 20, and collimatingly directs it to the interferometer 21 for wavefront analysis.

The test portion of the optical null testing system 20 includes the mirror 23, the deformable mirror apparatus 24, which are arranged with respect to the aspheric surface A to be characterized. The deformable mirror apparatus 24 is positioned under the aspheric surface A.

Figure 3:
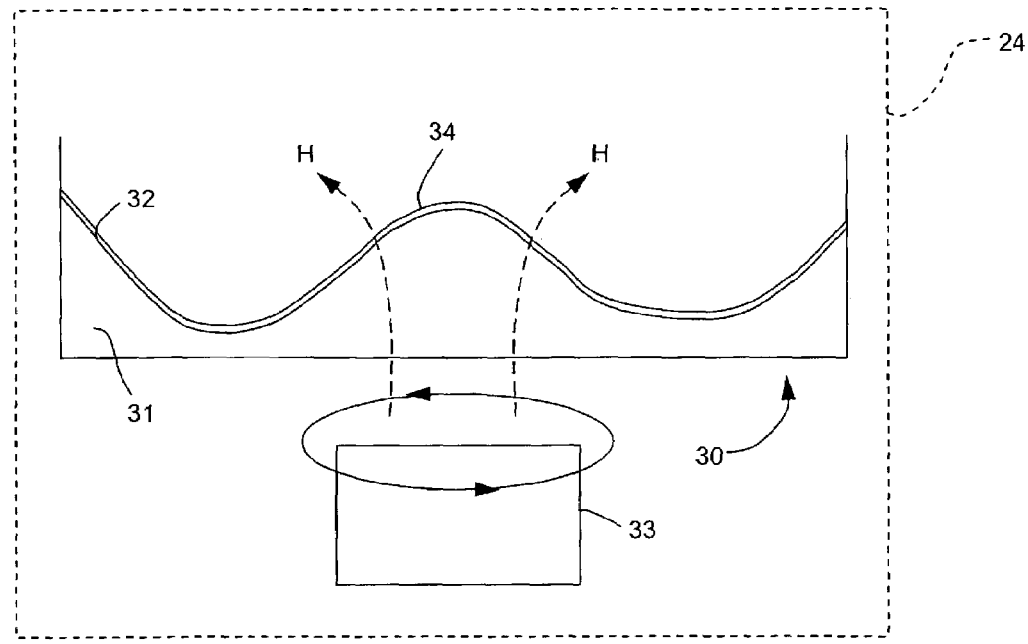
FIG. 3 is a schematic view of a deformable mirror apparatus in accordance with the present invention.

In a preferred embodiment of the present invention, the deformable mirror apparatus 24 typically has a container for retaining liquids, with one of the liquids having reflecting properties, such as a ferromagnetic liquid. The ferromagnetic liquid responds to forces induced by magnetic fields, so that it can be shaped to desired configurations with specific magnetic fields created by actuators of the deformable mirror apparatus 24. Referring to FIG. 3, one such deformable mirror apparatus 24 comprises a ferrofluid deformable mirror 30 consisting of a container retaining a base liquid 31, a ferromagnetic liquid 32 and a magnetic field actuator 33. The magnetic field actuator 33 will create magnetic fields H that will cause a controllable deformation of the ferromagnetic liquid 32 from a typical flat horizontal plane. Therefore, the ferromagnetic liquid 32 will be exposed at the top surface 34 of the deformable mirror 30. With the reflective properties of the ferromagnetic liquid 32, the top surface 34 is thus reflective, and may be shaped with predictable precision with the actuator 33. It is pointed out that although only one actuator 33 is shown in FIG. 3, a plurality of actuators can be spread below the container of liquid 31, to obtain the desired shape with the ferromagnetic fluid 32. Also, it is contemplated to use electrodes as an alternative to the magnetic field actuators 33, so as to shape the ferromagnetic fluid 32 by way of electrostatic actuation. Natural magnets could also provide suitable actuation.

Ferrofluid deformable mirrors are known and may have different configurations. For instance, the deformable mirror may include a metal liquid-like film (i.e., MELF) at the interface of two immiscible liquids. The metal liquid-like film may, for instance, be a silver or gold colloid. Mechanical deformable mirrors may also be used for the purposes of the present invention, but represent a non-optimal solution as the reflective surface of the mechanical deformable is limited in displacement amplitude.

Returning to FIG. 2, the deformable mirror apparatus 24 is positioned such that the top reflective surface 34 (seen in FIG. 3) faces the aspheric surface A. The reflective surface 34 is positioned at a design distance predicted by the f number of the aspheric surface A in order to minimize any vignetting of the light in the null testing system 20. The mirror 23 is positioned at the focus of the aspheric surface A and, preferably, at a converging point of the test wavefront $W_T$ transmitted by the light transmitter/receiver 22. The mirror 23 is typically a folding mirror of a suitable aperture. The mirror 23 can be replaced by a semitransparent film or other type of mirror, as long as the aperture of the mirror 23 does not cause any loss of light.

Now that the various components of the optical null testing system 20 have been described, the operation thereof will be described.

The test wavefront $W_T$ will have two directions. Namely, the test wavefront $W_T$ will be transmitted up to the deformable mirror apparatus 24 and will then return, typically using the same path, to return to the interferometer 21. Arrowheads have been schematically added to the wavefront $W_T$, with arrowheads 26 indicating the direction of the wavefront $W_T$ toward the deformable mirror apparatus 24, whereas arrowheads 27 indicate a return path of the wavefront $W_T$. The theoretical shape (i.e., flawless or expected shape) of an aspheric surface A is known and is represented by a mathematical formula. The ferrofluid deformable mirror (i.e., shown at 30 in FIG. 3) of the deformable mirror apparatus 24 is shaped as a function of this mathematical formula, such that the wavefront $W_T$ collimated by the aspheric surface A toward the reflective top surface 34 will be reflected and reverted back to the aspheric surface A, i.e., in a known way. Irregularities in the aspheric surface A will cause deviation of the wavefront $W_T$ from the expected path, i.e., the actual path will be different from the expected path, and will thus not be reflected back to the aspheric surface A.

The wavefront $W_T$ then returns to the mirror 23, according to arrowheads 27, to be reflected back to the light transmitter/receiver 22, to finally reach the interferometer 21. Light that has been deviated away by irregularities in the aspheric surface A will be represented by interference fringes in the interferometer 20 upon reunion of the test wavefront $W_T$ with the reference wavefront.

The analysis of the interference fringes will enable the precise determination of irregularities in the test surface A, with respect to the theoretical shape. The wavefront analyzer 25 is any suitable commercially available wavefront analyzer/analyzing software that will be adapted to interpret the interference fringes. The use of a MELF on the ferrofluid deformable mirror is characterized by its relatively high reflectivity in comparison with the top surface of the ferrofluid.

In order to get high contrast interference patterns, the intensity of both test and reference wavefronts must be approximately the same. As a practical example, with regards to the embodiment of FIG. 2, the reference wavefront (within the interferometer 21) typically has an intensity of about 4% of the test wavefront $W_T$. As mentioned above, the test wavefront $W_T$ makes a double reflection on the aspheric surface A and a single reflection on the ferrofluid deformable mirror 24. If $R_A$ is the reflectivity of the aspheric surface A and $R_{24}$ is the reflectivity of the ferrofluid deformable mirror 24, the test wavefront $W_T$ intensity after testing will be multiplied by a factor of $(R_A \times R_{24} \times R_A)$. For a highly reflective aspheric surface A, $R_A$ will be close to a value of 1 (i.e., with 1 being a fully reflective surface). Therefore, the coefficient $R_{24}$ must be low to get a test wavefront $W_T$ with an intensity close to the intensity of the reference wavefront (i.e., about 4%, as mentioned above), whereby no MELF will be used.

On the other hand, for a low reflectivity aspheric surface A (e.g., 4 to 5% reflectivity), the ferrofluid deformable mirror will not be enough. For instance, a transparent aspheric surface A (reflectivity in the vicinity of 4%), the coefficient $R_{24}$ must be high. The use of a MELF on the ferrofluid deformable mirror will help to increase the intensity of the test wavefront to an acceptable level.

Figure 4:
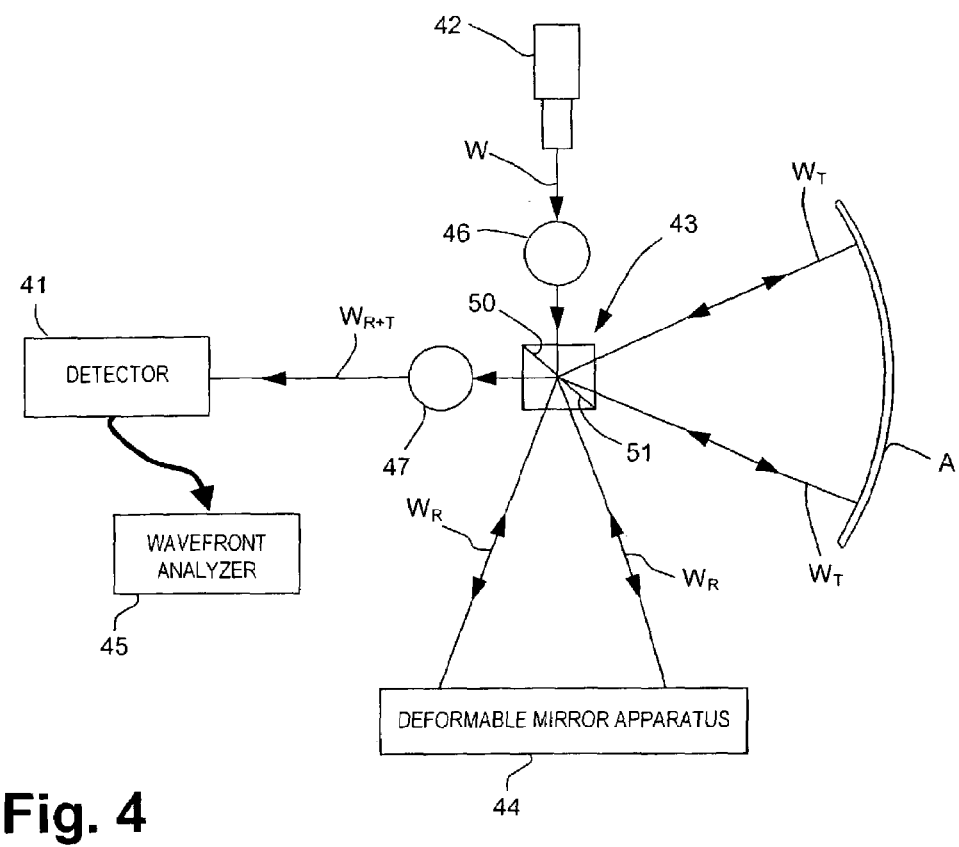
FIG. 4 is an optical null testing system in accordance with a second embodiment of the present invention.

Referring to FIG. 4, an optical null testing system in accordance with a second embodiment of the present invention is generally shown at 40. The null testing system 40 has a detector 41, a light source 42, a beam splitter 43, a deformable mirror apparatus 44, and a wavefront analyzer 45, all arranged for the characterization of an aspheric surface A. The light source 42 emits a monochromatic light wave W of constant phase that will be divided into a test wavefront $W_T$ and a reference wavefront $W_R$. The deformable mirror apparatus 44 and the wavefront analyzer 45 are as described for the first embodiment of the optical null testing system 20 of FIG. 2. The light source 42 is any available and suitable commercial light source emitting a monochromatic light wave of constant phase.

The light source 42 emits the light wave W toward the beam splitter 43. It is pointed out that any suitable optical elements can be used to obtain the proper propagation (e.g., divergence, convergence, etc.) of the light. For instance, a light transmitter 46 (e.g., transmitter sphere as described in the embodiment of FIG. 2) convergingly transmits the collimated light from the light source. The beam splitter 43 has a first surface 50 and a second surface 51. The first surface 50 is both reflective and transmissive. Therefore, the light wave W will be divided into the test wavefront $W_T$, that will be reflected by the first surface 50 of the beam splitter 43, and the reference wavefront $W_R$, that will be transmitted through the first surface 50 of the beam splitter 43. The test wavefront $W_T$ will be reflected to the aspheric surface A, whereas the reference wavefront $W_R$ will be transmitted to the deformable mirror apparatus 44. Preferably, the beam splitter 43 is positioned at the point of convergence of the test wavefront $W_T$ coming from the light transmitter 47.

Both the top reflective surface of the deformable mirror apparatus 44 and the test surface A are positioned at a same design distance (e.g., design distance d) from the light beam splitter 43. Preferably, the design distance is at the center of curvature of both the aspheric surface A and the deformable mirror apparatus 44, such that light reflected by the aspheric surface A and the deformable mirror apparatus 44 is focused at the center of curvature. The ferrofluid deformable mirror may be activated in order to produce a phase shift of one quarter of the wavelength (λ) for phase shifting interferometry. In such a case, the distance between the top reflective surface of the deformable mirror apparatus 44 and the light beam splitter 43 would be $$d + \frac{(n \times \lambda)}{4},$$

with n being any integer.

As mentioned previously for the first embodiment of the null testing system, the deformable mirror apparatus 44 has a top reflective surface that is shaped by a function of magnetic fields created by an actuator of the deformable mirror apparatus 44. In the present embodiment, the reflective surface of the deformable mirror apparatus 44 will be given the same shape as the theoretical shape (i.e., flawless, expected shape) of the aspheric surface A, such that the known path taken by the light reflected by the deformable mirror apparatus 44 is the same as the expected path that light reflected by the aspheric surface A would take if the latter was flawless.

Accordingly, if the aspheric surface A is flawless, the test wavefront $W_T$ reflected by the aspheric surface A (i.e., along the actual path) and the reference wavefront $W_R$ reflected by the deformable mirror apparatus 44 (i.e., along the known path) will be the same. The first surface 50 of the beam splitter 43 is adapted for transmitting at least part of the test wavefront $W_T$ reflected by the aspheric surface A, whereas the second surface 51 will reflect the reference wavefront $W_R$ reflected by the deformable mirror apparatus 44. Therefore, the test wavefront $W_T$ and the reference wavefront $W_R$ will be superposed downstream of the beam splitter 43, as illustrated at $W_{R+T}$, to then be supplied to the deflector 41. Optionally, a light transmitter 47 is positioned so as to collimate the test wavefront and the reference wavefront $W_{R+T}$.

Any surface irregularity of the aspheric surface A will cause a deflection of the test wavefront $W_T$ away from the test path. This will cause interference fringes in the detector 41, and the interference fringes are interpretable for the precise identification of the irregularities in the aspheric surface A. The detector 41 is any suitable commercially available high-resolution camera having lens objective of appropriate quality. As mentioned above, considering that to get high contrast interference patterns, the intensity of both test and reference wavefronts must be approximately the same, the use of a MELF in the deformable mirror apparatus 44 is dependent on the reflectivity of the aspheric surface A.

The ferrofluid deformable mirror is an advantageous alternative to the prior-art reference surfaces, as the top reflective surface of the deformable mirror can be given any desired shape. Therefore, one ferrofluid deformable mirror can be reused for different aspheric surfaces, with the magnetic fields of the actuator adapting/shaping beforehand the top reflective surface of the deformable mirror as a function of the test surface.

The commercially available ferrofluid deformable mirror apparatus can be shaped with enough precision to characterize irregularities in aspheric surfaces. The size of irregularities to be tested will be a function of the actuation of the deformable mirror apparatuses. P-V deformation (i.e., peak to valley) is the maximal deformation that can be performed with a ferrofluid under a defined magnetic field. By dividing the P-V deformation by the size of the irregularity the number of steps required on the deformable mirror apparatuses will be obtained. As an example, if it is desired to characterize an irregularity of 30 nanometers with a P-V deformation of 50 micrometers, 1667 steps must be addressed. With numerical actuation of the deformable mirror apparatus, at least 11 bits (i.e., $2^{11}$=2048 levels) will be required. If analog actuation Is used, it must be ensured that the actuation command will be enough to perform the characterization of the given irregularity.

Yet, such apparatuses are substantially cheaper in cost than the reproduction of high-precision reference surfaces (e.g., computer-generated hologram). Moreover, ferrofluid deformable mirrors can have shape variations in the range of centimeters and can thus adapt to a large range of complex aspheric surfaces.

A contemplated use of the null testing system and method of the present invention is the characterization of the newer generation of telescopes. The optics of these telescopes includes a plurality of different aspheric mirrors. Each of these mirrors could be characterized individually by the system and method of the present invention.

I claim:

1. A method for characterizing an aspheric surface with respect to an expected shape thereof, comprising the steps of:
   i) providing a deformable mirror apparatus having a reflective surface being controllably deformable;
   ii) shaping the reflective surface as a function of the expected shape of the aspheric surface so as to reflect light along a known path;
   iii) providing optical elements adapted to project light on the aspheric surface such that light would be reflected along an expected path if the aspheric surface had said expected shape;
   iv) projecting light with the optical elements on the aspheric surface such that light is reflected along an actual path;
   v) projecting light from the actual path on the reflective surface of the deformable mirror apparatus such that light is reflected along said known path back towards the aspheric surface;
   vi) receiving light reflected in said known path with the optical elements to obtain an interference pattern as a function of the expected path; and
   vii) interpreting the interference pattern to characterize the aspheric surface with respect to the expected shape.

2. The method according to claim 1, wherein in step iv) light is projected on the reflective surface from a focal point of the aspheric surface such that light is collimated in said actual path.

3. The method according to claim 1, wherein the reflective surface of the deformable mirror apparatus has a ferrofluid controllably deformable by magnetic actuation.

4. The method according to claim 1, wherein in step vii) the interference pattern is interpreted by adjusting a shape of the reflective surface at an initial value until the interference pattern is at a desired value, and determining the aspheric surface from the initial value and the desired value.

5. A system for characterizing an aspheric surface with respect to an expected shape thereof, comprising:
   a light source adapted to emit light of desirable properties;
   a deformable mirror apparatus having a reflective surface being controllably deformable, the reflective surface being shaped as a function of said expected shape so as to reflect light in a known path toward a detector;
   optical elements adapted to project light from the light source onto the aspheric surface such that light is reflected along an expected path if the aspheric surface has said expected shape, light being reflected from the aspheric surface along an actual path, the optical elements being further adapted to project light on the reflective surface of the deformable apparatus such that light is reflected along said known path, the known path consisting of light projected along said actual path being returned towards the aspheric surface;
   a detector adapted to receive light reflected along at least one of the actual path and the known path to obtain an interference pattern as a function of the expected path; and
   means for interpreting the interference pattern so as to characterize the aspheric surface with respect to said expected shape.

6. The system according to claim 5, wherein the reflective surface is shaped and positioned with respect to the aspheric surface such that the known path consists of light projected along said actual path being returned along said actual path to the detector to obtain the interference pattern between light in the known path and light in the expected path.

7. The system according to claim 6, wherein the light source and the detector are combined in an interferometer, the interferometer enclosing said expected path.

8. The system according to claim 7, wherein the optical elements include a mirror positioned at a focus of the aspheric surface such that light is collimated in said actual path.

9. The system according to claim 8, further comprising a light transmitter between the interferometer and the mirror so as to convergingly transmit light from the interferometer to the mirror, and for collimatingly transmit light from the mirror to the interferometer.

10. The system according to claim 9, wherein the mirror is further positioned at a converging point of light transmitted from the interferometer to the mirror.

11. The system according to claim 5, wherein the reflective surface of the deformable mirror apparatus has a ferrofluid controllably deformable by magnetic actuation.

* * * * *